(12) United States Patent
King

(10) Patent No.: US 12,725,452 B2
(45) Date of Patent: Sep. 1, 2026

(54) METHOD AND SYSTEM FOR AI PROCESSING AND CONTROL OF VISION-BASED DOOR SENSOR

(71) Applicant: Intellisense LLC, Windermere, FL (US)

(72) Inventor: Ryan King, Windermere, FL (US)

( * ) Notice: Subject to any disclaimer, the term of this patent is extended or adjusted under 35 U.S.C. 154(b) by 273 days.

(21) Appl. No.: 18/775,003

(22) Filed: Jul. 17, 2024

(65) Prior Publication Data

US 2026/0024375 A1 Jan. 22, 2026

(51) Int. Cl.

| | |
|---|---|
| ***G06V 40/20*** | (2022.01) |
| ***G06V 10/764*** | (2022.01) |
| ***G06V 10/82*** | (2022.01) |
| ***G06V 40/16*** | (2022.01) |
| ***G07C 9/30*** | (2020.01) |

(52) U.S. Cl.

CPC ............ *G06V 40/20* (2022.01); *G06V 10/764* (2022.01); *G06V 10/82* (2022.01); *G06V 40/161* (2022.01); *G07C 9/30* (2020.01)

(58) Field of Classification Search

CPC ...... G06V 40/20; G06V 10/764; G06V 10/82; G06V 40/161; G06V 20/52; G07C 9/30

USPC .......................................................... 382/103

See application file for complete search history.

(56) References Cited

U.S. PATENT DOCUMENTS

2021/0287539 A1* 9/2021 Cronje .................. G06F 18/214
2026/0095651 A1* 4/2026 Jonsson ................. G06V 20/52

* cited by examiner

*Primary Examiner* — Jennifer Mehmood
*Assistant Examiner* — Pardis Sohraby
(74) *Attorney, Agent, or Firm* — The Rapacke Law Group, P.A.; Andrew S. Rapacke; Kenneth F. Brooks

(57) ABSTRACT

A system for an automated processing of vision-based data for an automated door controller, including a processor of an automated door control server node configured to host a machine learning (ML) module and connected to at least one vision data capture entity and to at least one target controller of the automated door over a wireless network connection and a memory on which are stored machine-readable instructions that when executed by the processor, cause the processor to: acquire vision data from the at least one vision data capture entity reflecting a subject in a vicinity of the automated door, the vision data comprising a signal; normalize the signal for depth consistency; extract a set of classifying features reflecting movements of the subject relative to the automated door from the normalized signal; generate a classifier based on the set of classifying features; provide the classifier to the ML module configured to generate a predictive model based on a neural network for producing at least one decision parameter associated with an operation of the automated door; generate a command for operation of the automated door based on the at least one decision parameter; and send the command to the target controller.

20 Claims, 6 Drawing Sheets

400

METHOD AND SYSTEM FOR AI PROCESSING AND CONTROL OF VISION-BASED DOOR SENSOR

FIELD OF DISCLOSURE

The present disclosure generally relates to processing vision data for automated doors activation, and more particularly, to an AI-based automated system for processing of vision data for activation of connected door controllers.

BACKGROUND

The process of remote controlling of connected equipment such as automatic doors by analysis of video and/or motion detection data is commonly used. While users can typically activate automatic doors by moving into a close proximity, the user has to be very close to the door controller unit located within a certain short range from a connected automatic door actuation device within a Building Management System (BMS).

The existing BMS systems have very limited operational ranges and heavily depend on a single camera or motion detector locations. Thus, these systems provided for a limited secure door automation experience within a smart home, commercial building and/or broader living environments, including amenity spaces.

Accordingly, a system and method for an AI-based real-time processing of vision data for activation of connected automated door controllers are desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for an automated processing of vision-based data for an automated door controller, including a processor of an automated door control server node configured to host a machine learning (ML) module and connected to at least one vision data capture entity and to at least one target controller of the automated door over a wireless network connection and a memory on which are stored machine-readable instructions that when executed by the processor, cause the processor to: acquire vision data from the at least one vision data capture entity reflecting a subject in a vicinity of the automated door, the vision data comprising a signal; normalize the signal for depth consistency; extract a set of classifying features reflecting movements of the subject relative to the automated door from the normalized signal; generate a classifier based on the set of classifying features; provide the classifier to the ML module configured to generate a predictive model based on a neural network for producing at least one decision parameter associated with an operation of the automated door; generate a command for operation of the automated door based on the at least one decision parameter; and send the command to the target controller.

Another embodiment of the present disclosure provides a method that includes one or more of: acquiring vision data from the at least one vision data capture entity reflecting a subject in a vicinity of the automated door, the vision data comprising a signal; normalizing the signal for depth consistency; extracting a set of classifying features reflecting movements of the subject relative to the automated door from the normalized signal; generating a classifier based on the set of classifying features; providing the classifier to the ML module configured to generate a predictive model based on a neural network for producing at least one decision parameter associated with an operation of the automated door; generating a command for operation of the automated door based on the at least one decision parameter; and sending the command to the target controller.

Another embodiment of the present disclosure provides a computer-readable medium including instructions for acquiring vision data from the at least one vision data capture entity reflecting a subject in a vicinity of the automated door, the vision data comprising a signal; normalizing the signal for depth consistency; extracting a set of classifying features reflecting movements of the subject relative to the automated door from the normalized signal; generating a classifier based on the set of classifying features; providing the classifier to the ML module configured to generate a predictive model based on a neural network for producing at least one decision parameter associated with an operation of the automated door; generating a command for operation of the automated door based on the at least one decision parameter; and sending the command to the target controller.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
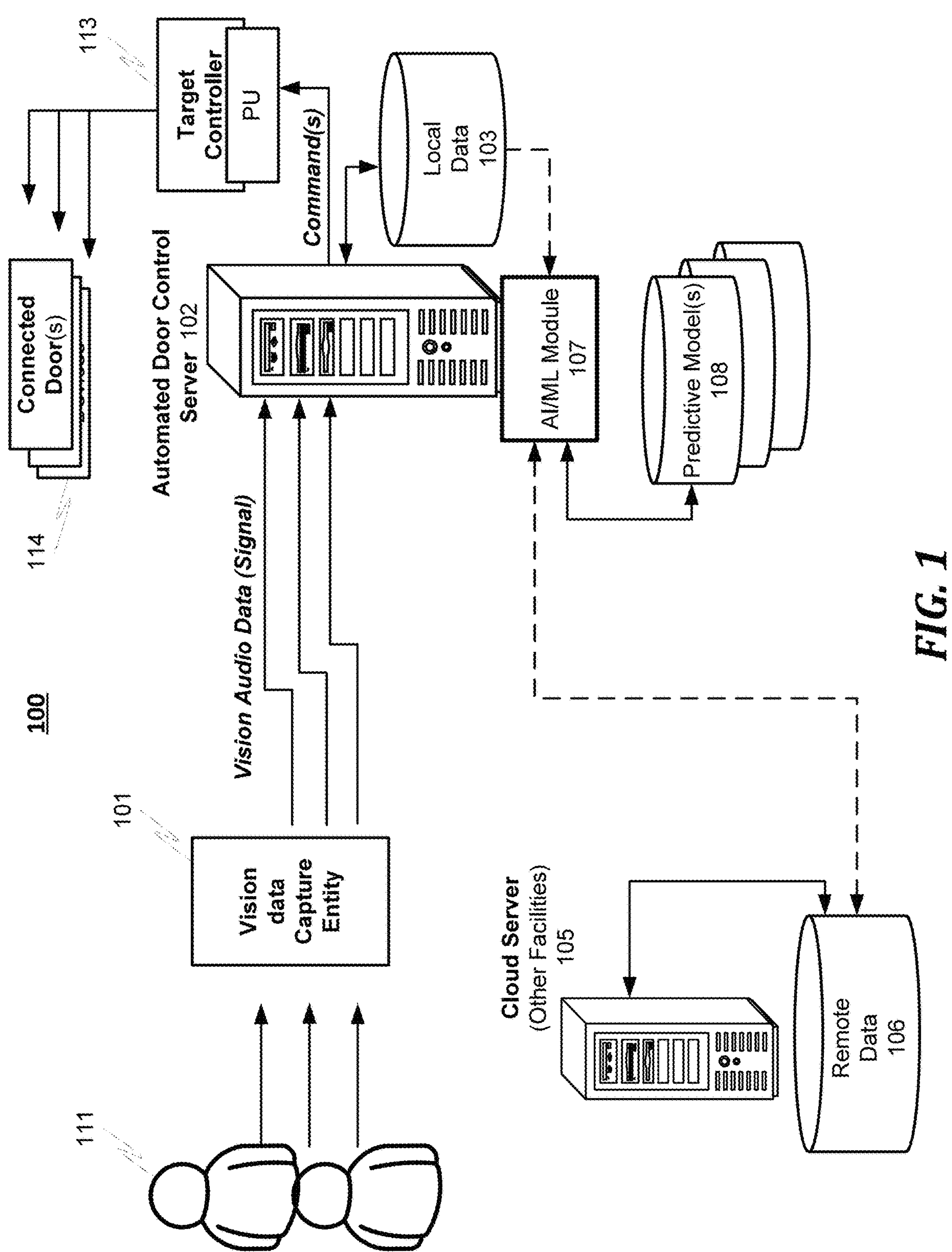
FIG. 1 illustrates a network diagram of a system for an AI-based automated processing of vision data for activation of connected door controllers, consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, 16, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of processing vision data for automated door activation, embodiments of the present disclosure are not limited to use only in this context.

The present disclosure provides a system, method and computer-readable medium for AI-based automated processing of vision data for generation of control commands for connected devices (e.g., doors) within a building management environment.

The present disclosure is focused on delivering an unparalleled vision data-based command response solution, designed to seamlessly integrate with any BMS systems. According to the disclosed embodiments, an AI-based Door Sensor system is an advanced automatic door system designed to enhance convenience and security by leveraging artificial intelligence. The system utilizes two separate models to function effectively. The first model is a computer vision model responsible for detecting and tracking individuals approaching the door. This model gathers data such as the presence of a person, speed, trajectory, distance from the door, and face orientation. The second model is a decision-making model that takes this data and intelligently decides based on fine-tuned machine learning (ML) model when to open or close the door. This dual-model approach ensures that each model specializes in its respective domain, optimizing the system's overall performance.

Using two separate models—one for computer vision tasks (detection and tracking) and another for making decisions based on the data from the vision model—is an effective approach. This separation allows each model to specialize and perform optimally in its respective domain as follows.

Computer Vision Model may be a proprietary model or may employ Models like YOLOv8 and BoT-SORT that are optimized for detection and tracking tasks, ensuring high accuracy and performance in identifying and following people in real-time. In one embodiment, these models may be specifically trained on proprietary system-relevant data-set to be more accurate for the intended use cases.

Decision-Making Model is the post processing phase of the Computer Vision (CV) model that uses data gained from the CV model to implement logics and predictive algorithms to determine when to generate control command(s) to open the door. A deep learning framework can specialize in processing the outputs from the CV model and making intelligent decisions based on learned patterns and relationships among the input factors.

In one embodiment, keeping the models separate makes the system modular. This modularity allows for easier updates and improvements. For instance, one can upgrade the detection model to a newer version without affecting the decision-making model. Additionally, one can retrain the decision-making model using different or additional classes and test the accuracy of the present and presented model side by side on the same data. The modularity may also simplifies debugging and maintenance since issues can be isolated to either the detection/tracking phase or the decision-making phase.

Additionally, running specialized models can be more efficient than trying to create a single model that handles everything. Each model can be optimized for its specific task, potentially improving overall system performance. In one embodiment, Jetson Orin Nano™ modules are capable of running multiple models in parallel, making it suitable for the proposed architecture. The modality may allow each model to be trained and fine-tuned independently.

In one embodiment, a Decision-Making Model may use Deep Learning Framework. As discussed above, the model may take the outputs from the computer vision model (presence, speed, trajectory, distance, face orientation) and makes intelligent decisions about door operation. It is trained to recognize patterns and combinations of these factors that indicate when to open or close the door.

To accurately determine when to open the door, the disclosed system may use model(s) trained on the following factors, all of which will be determined using computer vision. These data points may be fed into the AI model, which will make the final determination to open or close the door based on:

Presence of a Person:

- Detection: Using the model (e.g., YOLOv8), the system may identify whether a person is present in the camera's field of view. The model will provide accuracy and speed in real-time detection.
- Speed: Movement Speed relates to the rate at which the detected person is moving. This rate may be calculated from the positional changes across frames tracked by the a specially configured module using a special algorithm (e.g., BoT-SORT).
- Trajectory: Path Tracking relates to the system tracking the movement path of the person across multiple frames using the algorithm to establishing their trajectory.
- Direction of Movement: The system determines whether the person is moving towards the door, away from it, or in another direction. Only the movements towards the door are considered for opening decisions.

In one embodiment, the Distance from the Door is considered as follows:

- Proximity reflects the real-time distance between the detected person and the door being continuously measured using the tracked positions.
- Threshold Distance (D_t) reflects a predefined minimum distance that triggers the door to open if the person is within this range. This distance is adaptive and learned from the model based on the training data.

In yet another embodiment, Face Detection is taken into account as follows:

- Orientation: The system checks if the detected person's face is oriented towards the door, indicating their intent to enter.
- Gaze Detection: Additional analysis to determine if the person is looking directly at the door, providing further evidence of their approach intent.

In one disclosed embodiment, an Adaptive Threshold Distance is used. A key feature of the disclosed system and method is the ability to dynamically adjust the threshold distance (D_t) based on real-time analysis and learning from the trained model. Unlike traditional door sensors that open whenever someone is within a fixed distance, the disclosed system adapts the threshold based on the following:

- Entry Certainty: if the system detects with high confidence that a person is likely to enter the door (e.g., they are walking quickly towards the door and looking at the door), the threshold distance is increased, allowing the door to open sooner.
- Slow or Indirect Approach: If a person is moving slowly or not directly towards the door, the threshold distance is decreased, causing the door to wait until the person is closer before opening.
- Real-Time Adaptation: The system continually learns from real-time data, refining its decision-making process to optimize door operation based on the data collected locally or remotely at other locations having the doors of the same type.

As discussed above, the disclosed system may utilize a deep learning framework that integrates data from the computer vision models to make intelligent decisions about door operations. This framework processes real-time data, learning from various factors to optimize door responses. The key aspects include:

- Data Integration: The deep learning model takes input from the computer vision outputs—e.g., person presence, speed, trajectory, distance, and face orientation.
- Learning Mechanism: The model is trained to recognize patterns and combinations of factors that indicate when the door should open. For example, the model may learn to open the door sooner for fast-approaching individuals and to remain closed for slow or stationary ones until they are closer.
- Adaptive Decision-Making: The model adapts to various scenarios, ensuring the door opens intelligently based on real-time analysis of the input factors.

By training the model on these comprehensive factors and utilizing advanced computer vision techniques, the disclosed AI-based Door Sensor system makes precise and intelligent decisions about door operation, enhancing both functionality and security. This unique ability to adjust the threshold distance based on the situation ensures that the door opens exactly when it should, offering a significant improvement over the traditional door sensors.

In one embodiment of the present disclosure, the system provides for AI and machine learning (ML)-generated parameters to be used for analysis and generation of a command(s) sent to a controller of the connected target devices such as automatic doors. In one embodiment, an automated decision model may be generated to provide for action-related parameters associated with vision data captured by capturing devices such as, for example, depth cameras, etc.

The automated decision model may use historical vision data processing collected at the current location(s) and at other building facilities equipped with the doors and controllers of the same type located within a certain range from the current location or even located globally. The relevant vision data may include data related to other users having the same parameters such as the current user (i.e., a person approaching the door) such as age, race, gender, height, weight or locations, etc.

In one disclosed embodiment, the AI/ML technology may be combined with a blockchain technology for secure use of the model training data. In one embodiment, the controlled entities (e.g., doors) may be connected to the Automated Door Control Server (ADCS) node over a blockchain network for added security and to employ a consensus mechanism prior to executing a transaction to release the command related to activation of a connected target device based on the vision data-related predictive decision parameters.

FIG. 1 illustrates a network diagram of a system for an AI-based automated processing of vision data for activation of connected door controllers, consistent with the present disclosure.

As discussed above, an AI/ML module 107 may produce predictive parameters for processing user vision data based on the current captured vision data and based also on the collected vision data from other users of the same type used in training of the predictive model(s) 108. As such, based on the predictive parameters, the control signals may be generated and provided to the processing unit (PU) of the target controller 113 of the target connected devices (such as. For example, doors, windows and sun roofs, TVs or interactive displays, elevators, escalators, etc.). The disclosed automated AI-based vision data processing approach will, advantageously, reduce missed or misinterpreted automated device activations and equipment malfunctions while improving responsiveness, because the device control commands are very accurately generated based on fine-tuned training models 108.

According to the exemplary embodiments, the AI-based system 100 should be able to control doors 114 (including opening and auto-closing). The AI-based system 100 may provide control for those with disabilities—i.e., those with movement and hearing impairments. The AI-based system 100 may accommodate hearing and vision challenges.

Vision data capturing entity 101 nodes (e.g., depth camera or arrays of cameras) may be placed within the building to pick up vision data from users 111. The disclosed system 100, advantageously, provides for offline capabilities and low latency.

Referring to FIG. 1, the example network 100 includes the Automated Door Control Server (ADCS) node 102 may be connected to a cloud server node(s) 105 over a network. The ADCS node 102 is configured to host an AI/ML module 107. The ADCS node 102 may receive vision data from vision data capturing nodes (or arrays) 101. The vision capture data may contain variety of signals from at the least one capture entity node 101. In one embodiment, the signals data may be processed by the ADCS node 102 to parse out classifying features to be used by the AI/ML module 107 to produce predictive parameters that may be used to generate a control command(s) to be sent to the PU of the target controller 113 of connected target device(s) 114—e.g., automated doors.

The ADCS node 102 may query a local vision data-related database for the historical local vision data'-related parameters 103 associated with the current vision data classifying features. The ADCS node 102 may acquire relevant remote vision data'-related parameters 106 from a remote database residing on a cloud server 105. The remote data 106 may be collected from other private and/or commercial buildings, offices entities equipped with the same or similar automated door systems. The remote vision data and parameters 106 may be collected from users that had the same (or similar) physical features (e.g., height, weight), age, gender, race, locations, etc. as the local users' who are associated with the current captured vision data.

The ADCS node 102 may generate a feature vector or classifier based on the captured vision data and the collected heuristics data (i.e., pre-stored local data 103 and remote data 106). The ADCS node 102 may ingest the classifier/vector data into an AI/ML module 107. The AI/ML module 107 may generate a predictive model(s) 108 based on the classifier/vector data to predict action-related decision parameters for automatically generating a control command(s) to be provided to the connected target devices, doors 114 within the BMS. The action-related parameters may be further analyzed by the ADCS node 102 prior to generation of the command(s) in order to eliminate false-negatives/positives determinations especially at the earlier stages of training the model(s) 108.

Figure 2:
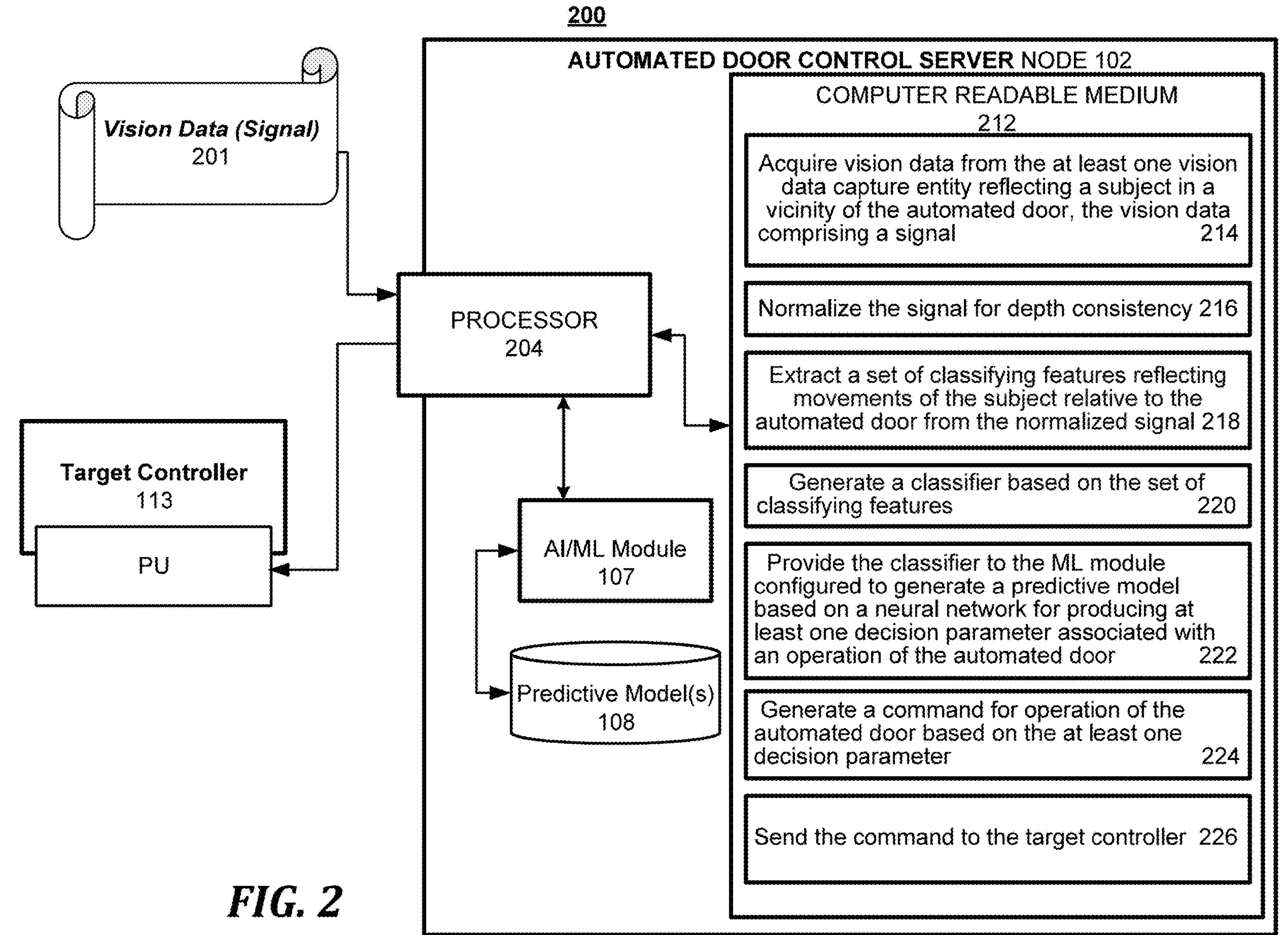
FIG. 2 illustrates a network diagram of a system including detailed features of an Automated Door Control Server (ADCS) node, consistent with the present disclosure.

FIG. 2 illustrates a network diagram of a system including detailed features of an Automated Door Control Server (ADCS) node, consistent with the present disclosure.

Referring to FIG. 2, the example network 200 includes the ADCS node 102 connected to vision data capturing nodes 101 (see FIG. 1) to receive vision data 201. The ADCS node 102 is configured to host an AI/ML module 107. As discussed above with respect to FIG. 1, the ADCS node 102 may receive the vision data 201 provided by the vision data capturing nodes (or arrays) 101 implemented as depth cameras.

The AI/ML module 107 may generate a predictive model(s) 108 based on the received vision data 201 processed by the ADCS node 102. As discussed above, the AI/ML module 107 may provide predictive outputs data in a form of command-related decision parameters for automatic generation of command signals for the target connected devices, (doors 114 in FIG. 1). In one embodiment, the ADCS node 102 may process the predictive outputs data received from the AI/ML module 107 to switch to an actuation—i.e., preparation to active the automatic doors 114.

As discussed above, the ADCS node 102 may acquire vision raw data from the vision data capture entity 101 (FIG. 1) to generate the commands for the target controller 113. While this example describes in detail only one ADCS node 102, multiple such nodes may be connected to the network and to the blockchain (not shown). It should be understood that the ADCS node 102 may include additional components and that some of the components described herein may be removed and/or modified without departing from a scope of the ADCS node 102 disclosed herein. The ADCS node 102 may be a computing device or a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the ADCS node 102 may include multiple processors, multiple cores, or the like, without departing from the scope of the VCPS node 102 system.

The ADCS node 102 may also include a non-transitory computer readable medium 212 that may have stored thereon machine-readable instructions executable by the processor 204. Examples of the machine-readable instructions are shown as 214-226 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to acquire vision data from the at least one vision data capture entity 101 reflecting a subject 111 in a vicinity of the automated door 114 (FIG. 1), the vision data comprising a signal. The processor 204 may fetch, decode, and execute the machine-readable instructions 216 to normalize the signal for depth consistency. The processor 204 may fetch, decode, and execute the machine-readable instructions 218 to extract a set of classifying features reflecting movements of the subject relative to the automated door from the normalized signal. The processor 204 may fetch, decode, and execute the machine-readable instructions 220 to generate a classifier based on the set of classifying features.

The processor 204 may fetch, decode, and execute the machine-readable instructions 222 to provide the classifier to the ML module configured to generate a predictive model based on a neural network for producing at least one decision parameter associated with an operation of the automated door. The processor 204 may fetch, decode, and execute the machine-readable instructions 224 to generate a command for operation of the automated door based on the at least one decision parameter. The processor 204 may fetch, decode, and execute the machine-readable instructions 226 to send the command to the target controller.

In one embodiment, the permissioned blockchain (not shown) may be configured to use one or more smart contracts that manage transactions related model 108 training for multiple participating nodes and for recording the transactions on a ledger as discussed in more detail below with respect to FIG. 4.

Figure 3A:
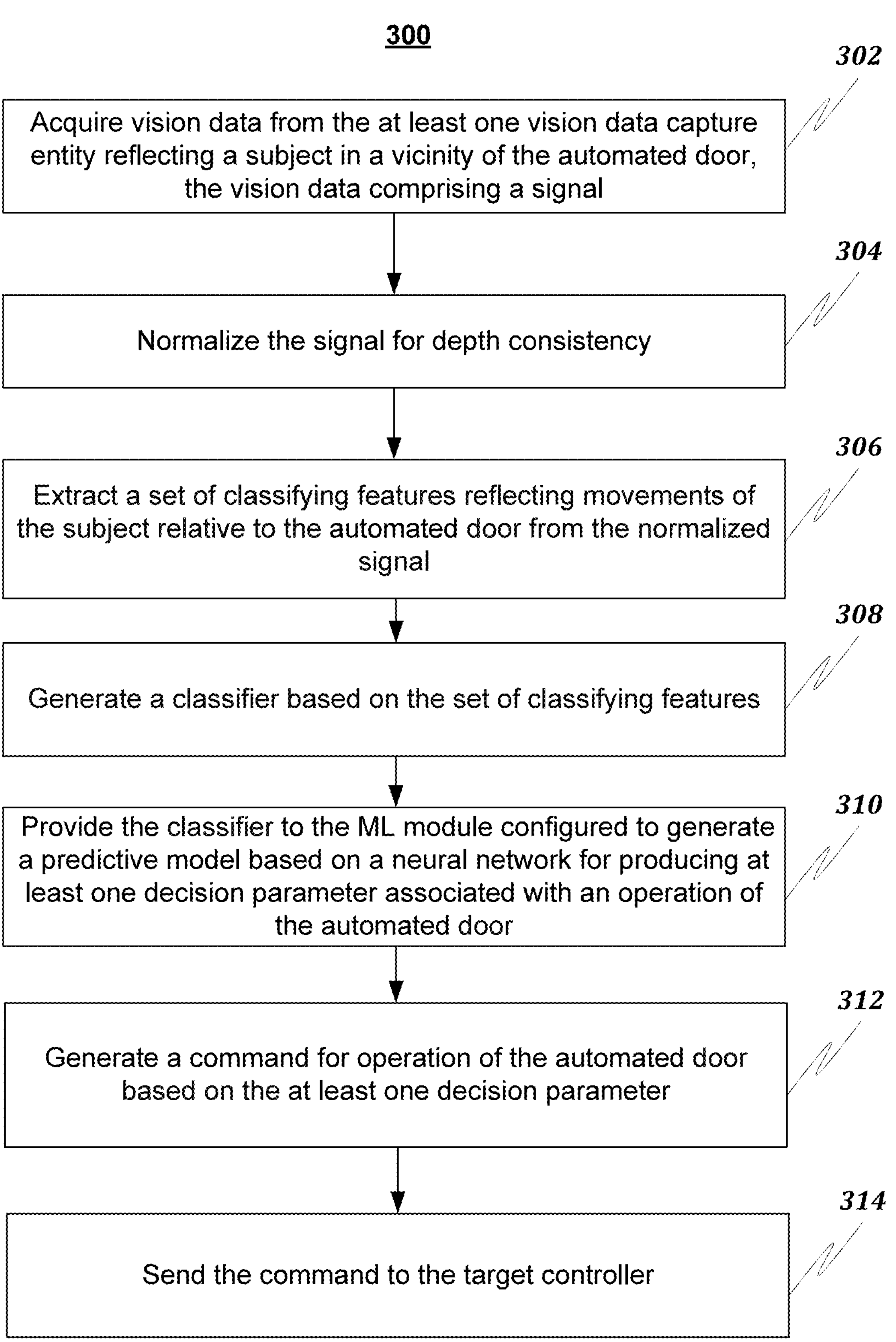
FIG. 3A illustrates a flowchart of a method for an AI-based automated processing of vision data for activation of connected door controllers consistent with the present disclosure.

FIG. 3A illustrates a flowchart of a method for an AI-based automated processing of vision data for activation of connected door controllers consistent with the present disclosure.

Referring to FIG. 3A, the method 300 may include one or more of the steps described below. FIG. 3A illustrates a flowchart of an example method executed by the ADCS 102 (see FIG. 2). It should be understood that method 300 depicted in FIG. 3A may include additional operations and that some of the operations described therein may be removed and/or modified without departing from the scope of the method 300. The description of the method 300 is also made with reference to the features depicted in FIG. 2 for purposes of illustration. Particularly, the processor 204 of the ADCS node 102 may execute some or all of the operations included in the method 300.

With reference to FIG. 3A, at block 302, the processor 204 may acquire vision data from the at least one vision data capture entity reflecting a subject in a vicinity of the automated door, the vision data comprising a signal. At block 304, the processor 204 may normalize the signal for depth consistency. At block 306, the processor 204 may extract a set of classifying features reflecting movements of the subject relative to the automated door from the normalized signal. At block 308, the processor 204 may generate a classifier based on the set of classifying features. At block 310, the processor 204 may provide the classifier to the ML module configured to generate a predictive model based on a neural network for producing at least one decision parameter associated with an operation of the automated door. At block 312, the processor 204 may generate a command for operation of the automated door based on the at least one decision parameter. At block 314, the processor 204 may send the command to the target controller.

Figure 3B:
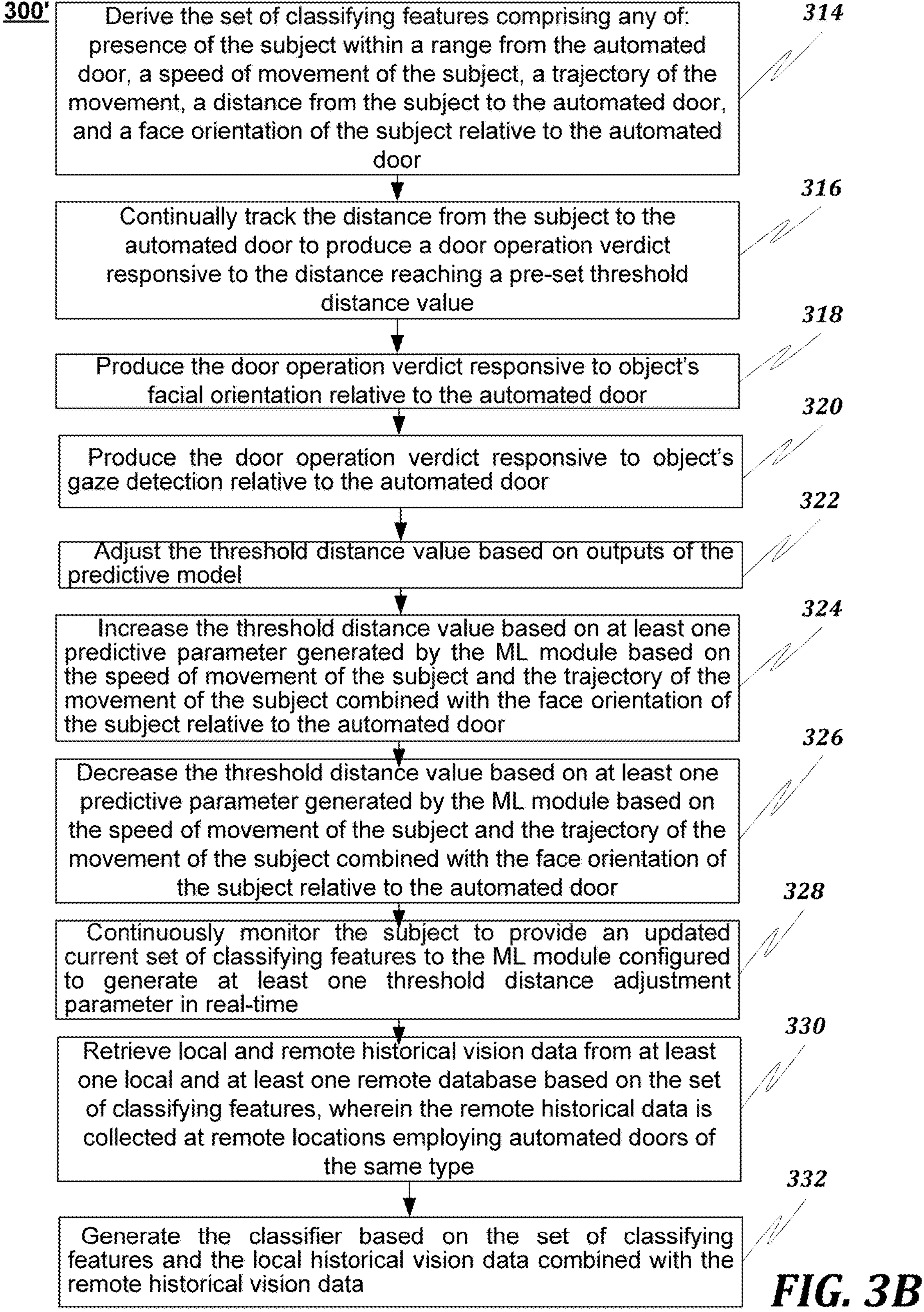
FIG. 3B illustrates a further flowchart of a method for an AI-based automated processing of vision data for activation of connected door controllers consistent with the present disclosure.

FIG. 3B illustrates a further flowchart of a method for an AI-based automated processing of vision data for activation of connected door controllers consistent with the present disclosure.

Referring to FIG. 3B, the method 300' may include one or more of the steps described below. FIG. 3B illustrates a flowchart of an example method executed by the ADCS 102 (see FIG. 2). It should be understood that method 300' depicted in FIG. 3B may include additional operations and that some of the operations described therein may be removed and/or modified without departing from the scope of the method 300'. The description of the method 300' is also made with reference to the features depicted in FIG. 2 for purposes of illustration. Particularly, the processor 204 of the ADCS 102 may execute some or all of the operations included in the method 300'.

With reference to FIG. 3B, at block 314, the processor 204 may derive the set of classifying features comprising any of: presence of the subject within a range from the automated door, a speed of movement of the subject, a trajectory of the movement, a distance from the subject to the automated door, and a face orientation of the subject relative to the automated door. At block 316, the processor 204 may continually track the distance from the subject to the automated door to produce a door operation verdict responsive to the distance reaching a pre-set threshold distance value. At block 318, the processor 204 may produce the door operation verdict responsive to object's facial orientation relative to the automated door. At block 320, the processor 204 may produce the door operation verdict responsive to object's gaze detection relative to the automated door.

At block 322, the processor 204 may adjust the threshold distance value based on outputs of the predictive model. At block 324, the processor 204 may increase the threshold distance value based on at least one predictive parameter generated by the ML module based on the speed of movement of the subject and the trajectory of the movement of the subject combined with the face orientation of the subject relative to the automated door. At block 326, the processor 204 may decrease the threshold distance value based on at least one predictive parameter generated by the ML module based on the speed of movement of the subject and the trajectory of the movement of the subject combined with the face orientation of the subject relative to the automated door. At block 328, the processor 204 may continuously monitor the subject to provide an updated current set of classifying features to the ML module configured to generate at least one threshold distance adjustment parameter in real-time. At block 330, the processor 204 may retrieve local and remote historical vision data from at least one local and at least one remote database based on the set of classifying features, wherein the remote historical data is collected at remote locations employing automated doors of the same type. At block 332, the processor 204 may generate the classifier based on the set of classifying features and the local historical vision data combined with the remote historical vision data.

In one disclosed embodiment, the command-related decision parameters' model may be generated by the AI/ML module 107 that may use training data sets to improve accuracy of the prediction of the decision parameters for the connected target devices (i.e., doors 114 in FIG. 1). The decision parameters used in training data sets may be stored in a centralized local database (such as one used for storing local data 103 depicted in FIG. 1). In one embodiment, a neural network may be used in the AI/ML module 107 for the decision parameters modeling and command predictions.

In another embodiment, the AI/ML module 107 may use a decentralized storage such as a blockchain that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers 102, 105 and 113 (FIG. 1) may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as storing decision command-related parameters for efficient activation of the target devices, but which do not fully trust one another.

This application utilizes a permissioned (private) blockchain that operates arbitrary, programmable logic, tailored to a decentralized storage scheme and referred to as "smart contracts" or "chaincodes." In some cases, specialized chaincodes may exist for management functions and parameters which are referred to as system chaincodes. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincodes to specify endorsers for a transaction in the form of a set of peer nodes that are necessary for endorsement. When a client sends the transaction to the peers specified in the endorsement policy, the transaction is executed to validate the transaction. After a validation, the transactions enter an ordering phase in which a consensus protocol is used to produce an ordered sequence of endorsed transactions grouped into blocks.

Figure 4:
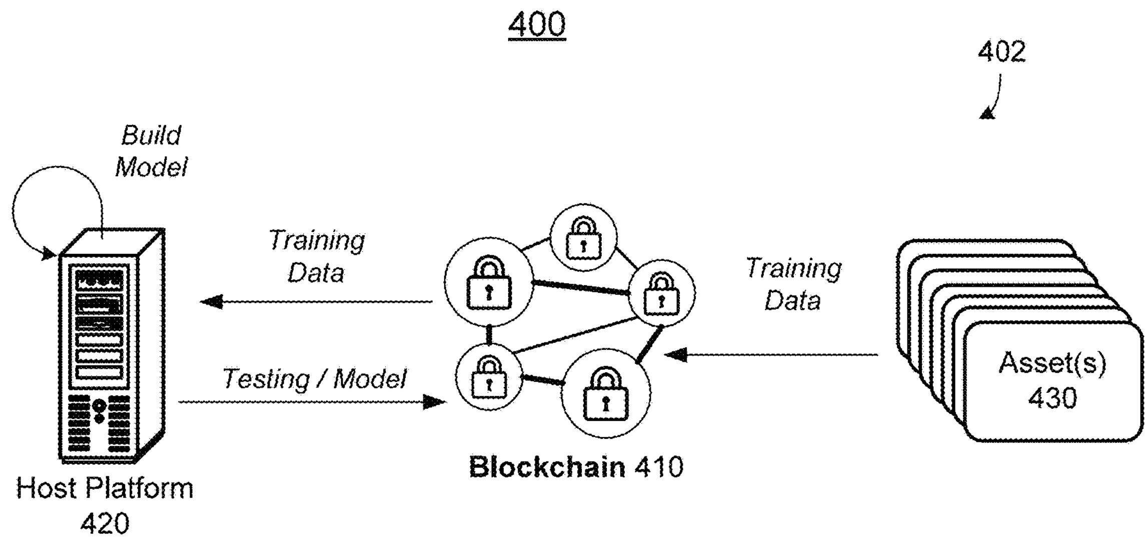
FIG. 4 illustrates deployment of a machine learning model for prediction of decision parameters and other door automation-related parameters using blockchain assets consistent with the present disclosure.
Figure 4:
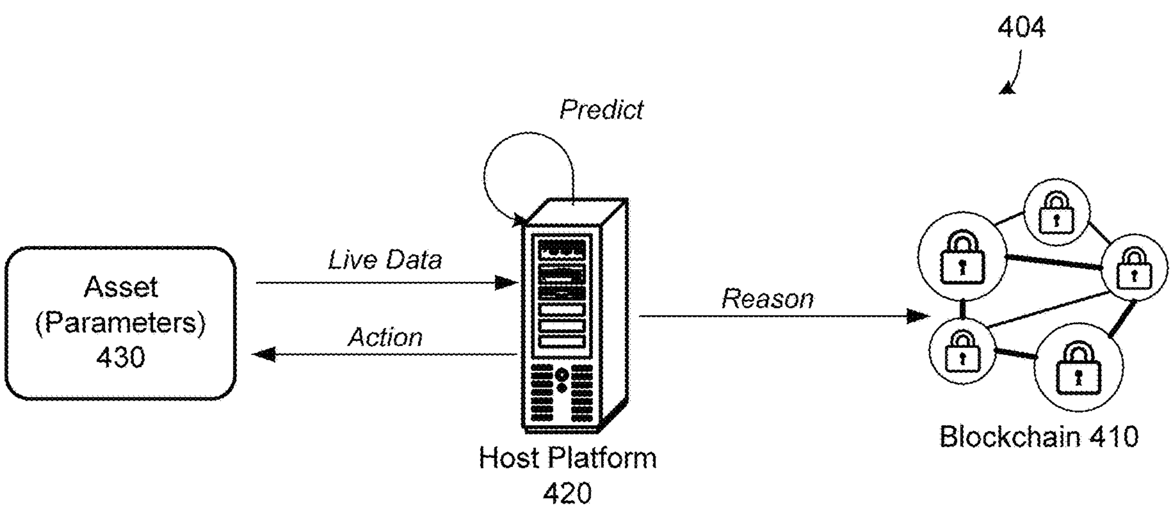

In the example depicted in FIG. 4, a host platform 420 (such as the ADCS node 102) builds and deploys a machine learning model for predictive monitoring of assets 430. Here, the host platform 420 may be a cloud platform, an industrial server, a web server, a personal computer, a user device, and the like. Assets 430 can represent commands'-related parameters. The blockchain 410 can be used to significantly improve both a training process 402 of the machine learning model and the commands'-related parameters' predictive process 405 based on a trained machine learning model. For example, in 402, rather than requiring a data scientist/engineer or other user to collect the data, historical data (heuristics—i.e., vision capture data) may be stored by the assets 430 themselves (or through an intermediary, not shown) on the blockchain 410.

This can significantly reduce the collection time needed by the host platform 420 when performing predictive model training. For example, using smart contracts, data can be directly and reliably transferred straight from its place of origin (e.g., from the entities 101 or from databases 103 and 106) to the blockchain 410. By using the blockchain 410 to ensure the security and ownership of the collected data, smart contracts may directly send the data from the assets to the entities that use the data for building a machine learning model. This allows for sharing of data among the assets 430. The collected data may be stored in the blockchain 410 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure.

Furthermore, training of the machine learning model on the collected data may take rounds of refinement and testing by the host platform 420. Each round may be based on additional data or data that was not previously considered to help expand the knowledge of the machine learning model. In 402, the different training and testing steps (and the data associated therewith) may be stored on the blockchain 410 by the host platform 420. Each refinement of the machine learning model (e.g., changes in variables, weights, etc.) may be stored on the blockchain 410. This provides verifiable proof of how the model was trained and what data was used to train the model. Furthermore, when the host platform 420 has achieved a finally trained model, the resulting model itself may be stored on the blockchain 410.

After the model has been trained, it may be deployed to a live environment where it can make command-related predictions/decisions based on the execution of the final trained machine learning model using the commands'-related parameters. In this example, data fed back from the asset 430 may be input into the machine learning model and may be used to make event predictions such as most accurate commands' parameters for performing actions with the target devices based on the incoming captured vision data. Determinations made by the execution of the machine learning model (e.g., decision parameters, etc.) at the host platform 420 may be stored on the blockchain 410 to provide auditable/verifiable proof. As one non-limiting example, the machine learning model may predict a future change of a part of the asset 430 (the command-related decision' parameters). The data behind this decision may be stored by the host platform 420 on the blockchain 410.

As discussed above, in one embodiment, the features and/or the actions described and/or depicted herein can occur on or with respect to the blockchain 410. The above embodiments of the present disclosure may be implemented in hardware, in a computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 5 illustrates an example computing device (e.g., a server node) 500, which may represent or be integrated in any of the above-described components, etc.

Figure 5:
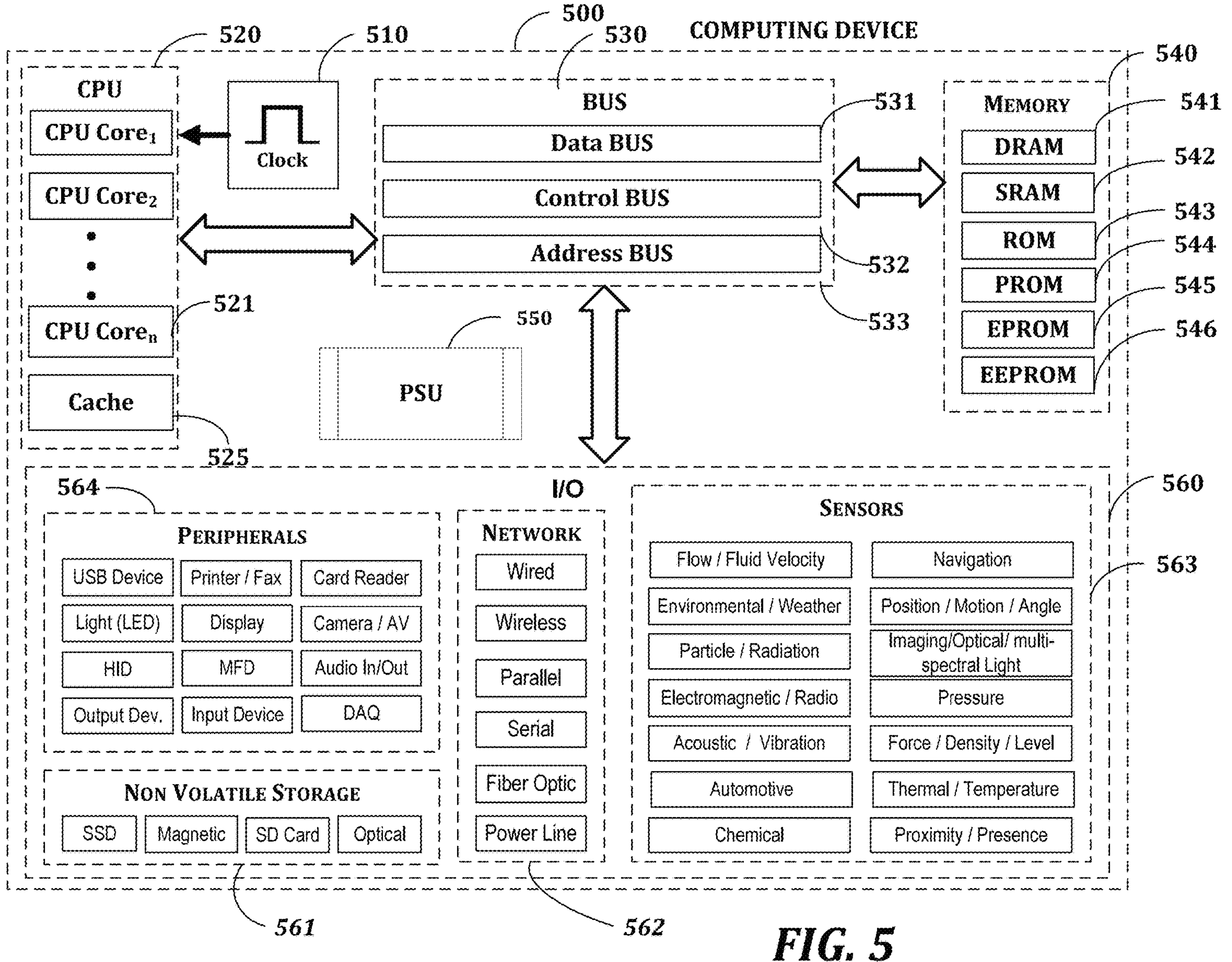
FIG. 5 illustrates a block diagram of a system including a computing device for performing the method of FIGS. 3A and 3B.

FIG. 5 illustrates a block diagram of a system including computing device 500. The computing device 500 may comprise, but not be limited to the following:

- Mobile computing device, such as, but is not limited to, a laptop, a tablet, a smartphone, a drone, a wearable, an embedded device, a handheld device, an Arduino, an industrial device, or a remotely operable recording device;
- A supercomputer, an exa-scale supercomputer, a mainframe, or a quantum computer;
- A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;
- A microcomputer, wherein the microcomputer computing device comprises, but is not limited to, a server, wherein a server may be rack mounted, a workstation, an industrial device, a raspberry pi, a desktop, or an embedded device;
- The ADCS node 102 (see FIG. 2) may be hosted on a centralized server or on a cloud computing service. Although method 300 has been described to be performed by the ADCS node 102 implemented on a computing device 500, it should be understood that, in some embodiments, different operations may be performed by a plurality of the computing devices 500 in operative communication at least one network.

Embodiments of the present disclosure may comprise a computing device having a central processing unit (CPU) 520, a bus 530, a memory unit 550, a power supply unit (PSU) 550, and one or more Input/Output (I/O) units. The CPU 520 coupled to the memory unit 550 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages any method disclosed herein.

Consistent with an embodiment of the disclosure, the aforementioned CPU 520, the bus 530, the memory unit 550, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 550 may be implemented with computing device 500 or any of other computing devices 500, in combination with computing device 500. The aforementioned system, device, and components are examples and other systems, devices, and components may comprise the aforementioned CPU 520, the bus 530, the memory unit 550, consistent with embodiments of the disclosure.

At least one computing device 500 may be embodied as any of the computing elements illustrated in all of the attached figures, including the ADCS node 102 (FIG. 2). A computing device 500 does not need to be electronic, nor even have a CPU 520, nor bus 530, nor memory unit 550. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 550, at least one PSU 550, and at least one I/O 560 module, wherein I/O module may be comprised of, but not limited to a non-volatile storage sub-module 561, a communication sub-module 562, a sensors sub-module 563, and a peripherals sub-module 565.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 550 or input/output 560). Some embodiments of the clock 510 may include dynamic frequency change, where, the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 550, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, superscalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

- Internal data bus (data bus) 531/Memory bus
- Control bus 532
- Address bus 533
- System Management Bus (SMBus)
- Front-Side-Bus (FSB)
- External Bus Interface (EBI)
- Local bus
- Expansion bus
- Lightning bus
- Controller Area Network (CAN bus)
- Camera Link
- ExpressCard
- Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
- Small Computer System Interface (SCSI)/Serial Attached SCSI (SAS)
- HyperTransport
- InfiniBand
- RapidIO
- Mobile Industry Processor Interface (MIPI)
- Coherent Processor Interface (CAPI)
- Plug-n-play
- 1-Wire
- Peripheral Component Interconnect (PCI), including embodiments such as, but not limited to, Accelerated Graphics Port (AGP), Peripheral Component Interconnect extended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper {Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
- Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).
- Music Instrument Digital Interface (MIDI)
- Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1395 Interface/Firewire, Thunderbolt, and extensible Host Controller Interface (xHCI).

Consistent with the embodiments of the present disclosure, the aforementioned computing device 500 may employ hardware integrated circuits that store information for immediate use in the computing device 500, know to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

- Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by the at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using intermediate area in the memory 550. The non-volatile storage sub-module 561 does not lose data when power is removed and may be two orders of magnitude less costly than storage used in memory module, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD+RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be said are networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6

[IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

- Wired communications, such as, but not limited to, coaxial cable, phone lines, twisted pair cables (ethernet), and InfiniBand.
- Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 5G (such as WiMax and LTE), and 5G (short and long wavelength).
- Parallel communications, such as, but not limited to, LPT ports.
- Serial communications, such as, but not limited to, RS-232 and USB.
- Fiber Optic communications, such as, but not limited to, Single-mode optical fiber (SMF) and Multi-mode optical fiber (MMF).
- Power Line and wireless communications The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

- Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).
- Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.
- Acoustic, sound and vibration sensors, such as, but not limited to, microphone, lace sensor (guitar pickup), seismometer, sound locator, geophone, and hydrophone.
- Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.
- Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.
- Flow and fluid velocity sensors, such as, but not limited to, air flow meter, anemometer, flow sensor, gas meter, mass flow sensor, and water meter.
- Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.
- Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

- Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.
- Imaging, optical and light sensors, such as, but not limited to, CMOS sensor, LIDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.
- Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.
- Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.
- Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.
- Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices uses to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

- Modality of input, such as, but not limited to, mechanical motion, audio, vision, and tactile.
- Whether the input is discrete, such as but not limited to, pressing a key, or continuous such as, but not limited to position of a mouse.
- The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 565:

Input Devices

- Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).
- High degree of freedom devices, that require up to six degrees of freedom such as, but not limited to, camera gimbals, Cave Automatic Virtual Environment (CAVE), and virtual reality systems.
- Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.
- Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.
- Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

- Display devices, which convert electrical information into vision form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A system for an automated processing of vision-based data for an automated door controller, comprising:

a processor of an automated door control server node configured to host a machine learning (ML) module and connected to at least one vision data capture entity and to at least one target controller of the automated door over a wireless network connection; and a memory on which are stored machine-readable instructions that when executed by the processor, cause the processor to:

acquire vision data from the at least one vision data capture entity reflecting a subject in a vicinity of the automated door, the vision data comprising a signal;

normalize the signal for depth consistency;

extract a set of classifying features reflecting movements of the subject relative to the automated door from the normalized signal;

generate a classifier based on the set of classifying features;

provide the classifier to the ML module configured to generate a predictive model based on a neural network for producing at least one decision parameter associated with an operation of the automated door;

generate a command for operation of the automated door based on the at least one decision parameter; and send the command to the target controller.

2. The system of claim 1, wherein the machine-readable instructions that when executed by the processor, cause the processor to derive the set of classifying features comprising any of: presence of the subject within a range from the automated door, a speed of movement of the subject, a trajectory of the movement, a distance from the subject to the automated door, and a face orientation of the subject relative to the automated door.

3. The system of claim 2, wherein the machine-readable instructions that when executed by the processor, cause the processor to continually track the distance from the subject to the automated door to produce a door operation verdict responsive to the distance reaching a pre-set threshold distance value.

4. The system of claim 3, wherein the machine-readable instructions that when executed by the processor, cause the processor to produce the door operation verdict responsive to object's facial orientation relative to the automated door.

5. The system of claim 4, wherein the machine-readable instructions that when executed by the processor, cause the processor to produce the door operation verdict responsive to object's gaze detection relative to the automated door.

6. The system of claim 3, wherein the machine-readable instructions that when executed by the processor, cause the processor to adjust the threshold distance value based on outputs of the predictive model.

7. The system of claim 6, wherein the machine-readable instructions that when executed by the processor, cause the processor to increase the threshold distance value based on at least one predictive parameter generated by the ML module based on the speed of movement of the subject and the trajectory of the movement of the subject combined with the face orientation of the subject relative to the automated door.

8. The system of claim 6, wherein the machine-readable instructions that when executed by the processor, cause the processor to decrease the threshold distance value based on at least one predictive parameter generated by the ML module based on the speed of movement of the subject and the trajectory of the movement of the subject combined with the face orientation of the subject relative to the automated door.

9. The system of claim 6, wherein the machine-readable instructions that when executed by the processor, cause the processor to continuously monitor the subject to provide an updated current set of classifying features to the ML module configured to generate at least one threshold distance adjustment parameter in real-time.

10. The system of claim 1, wherein the machine-readable instructions that when executed by the processor, cause the processor to cause the processor to retrieve local and remote historical vision data from at least one local and at least one remote database based on the set of classifying features, wherein the remote historical data is collected at remote locations employing automated doors of the same type.

11. The system of claim 10, wherein the machine-readable instructions that when executed by the processor, cause the processor to cause the processor to generate the classifier based on the set of classifying features and the local historical vision data combined with the remote historical vision data.

12. A method for an automated processing of vision-based data for an automated door controller, comprising:

acquiring, by an automated door control server (ADCS) node, vision data from at least one vision data capture entity reflecting a subject in a vicinity of an automated door, the vision data comprising a signal;

normalizing, by the ADCS node, the signal for depth consistency;

extracting, by the ADCS node, a set of classifying features reflecting movements of the subject relative to the automated door from the normalized signal;

generating, by the ADCS node, a classifier based on the set of classifying features;

providing, by the ADCS node, the classifier to the ML module configured to generate a predictive model based on a neural network for producing at least one decision parameter associated with an operation of the automated door;

generating, by the ADCS node, a command for operation of the automated door based on the at least one decision parameter; and sending, by the ADCS node, the command to the target controller.

13. The method of claim 12, further comprising deriving the set of classifying features comprising any of: presence of the subject within a range from the automated door, a speed of movement of the subject, a trajectory of the movement, a distance from the subject to the automated door, and a face orientation of the subject relative to the automated door.

14. The method of claim 13, further comprising continually tracking the distance from the subject to the automated door to produce a door operation verdict responsive to the distance reaching a pre-set threshold distance value.

15. The method of claim 14, further comprising adjusting the threshold distance value based on outputs of the predictive model.

16. The method of claim 15, further comprising increasing the threshold distance value based on at least one predictive parameter generated by the ML module based on the speed of movement of the subject and the trajectory of the movement of the subject combined with the face orientation of the subject relative to the automated door.

17. The method of claim 15, further comprising decreasing the threshold distance value based on at least one predictive parameter generated by the ML module based on the speed of movement of the subject and the trajectory of the movement of the subject combined with the face orientation of the subject relative to the automated door.

18. A non-transitory computer-readable medium comprising instructions, that when read by a processor, cause the processor to perform:

acquiring vision data from at least one vision data capture entity reflecting a subject in a vicinity of an automated door, the vision data comprising a signal;

normalizing the signal for depth consistency;

extracting a set of classifying features reflecting movements of the subject relative to the automated door from the normalized signal;

generating a classifier based on the set of classifying features;

providing the classifier to the ML module configured to generate a predictive model based on a neural network for producing at least one decision parameter associated with an operation of the automated door;

generating a command for operation of the automated door based on the at least one decision parameter; and sending the command to the target controller.

19. The non-transitory computer-readable medium of claim 18 comprising instructions, that when read by a processor, cause the processor to perform: continually tracking a distance from the subject to the automated door to produce a door operation verdict responsive to the distance reaching a pre-set threshold distance value.

20. The non-transitory computer-readable medium of claim 19 comprising instructions, that when read by a processor, cause the processor to perform: adjusting the threshold distance value based on outputs of the predictive model.

* * * * *